United States Patent [19]

Malkki et al.

[11] 3,996,386
[45] Dec. 7, 1976

[54] METHOD FOR PREVENTING MICROBIAL SURFACE DETERIORATION OF FOODS AND FEEDS

[76] Inventors: Yrjo Malkki, Lounaisvayla 19, Helsinki 20; Olavi Elis Nikkila, Perustie 13 A 12, Helsinki 33, both of Finland

[22] Filed: Sept. 9, 1974

[21] Appl. No.: 504,715

Related U.S. Application Data

[63] Continuation-in-part of Ser. No. 315,186, Dec. 14, 1972, abandoned.

[30] Foreign Application Priority Data

Dec. 15, 1971 Finland .............................. 3568/71

[52] U.S. Cl. ................................ 426/321; 426/331; 426/332; 426/334; 426/335; 426/541; 426/549; 426/582; 426/614; 426/615; 426/618; 426/641; 426/643; 426/644

[51] Int. Cl.$^2$ ................... A21D 15/08; A23C 3/08; A23L 3/34

[58] Field of Search .......... 426/116, 151, 227, 228, 426/235, 236, 312, 314, 315, 316, 318, 319, 320, 302, 310, 326, 56, 63; 424/43, 45, 114, 305

[56] References Cited

UNITED STATES PATENTS

| | | | |
|---|---|---|---|
| 2,876,110 | 3/1959 | Stadelman et al. | 426/227 |
| 2,980,582 | 4/1961 | Keats | 426/116 X |
| 3,033,691 | 5/1962 | Smythe et al. | 426/63 |
| 3,130,057 | 4/1964 | Williams | 426/56 X |
| 3,503,760 | 3/1970 | Allen | 426/312 |

*Primary Examiner*—A. Louis Monacell
*Assistant Examiner*—R. A. Yoncoskie
*Attorney, Agent, or Firm*—Haseltine, Lake & Waters

[57] ABSTRACT

Method for preventing moulding or other microbial surface deterioration of foods and feeds due to microorganisms by using a preservative substance, either a chemically defined food additive or a vegetable extract having microbicidal or microbe-inhibiting effect. The preservative is applied in the form of an aerosol in which a substantial part of the particles or droplets in the aerosol have a diameter less than 5 microns, preferably within the limits 0.2–2 microns. The aim of the present invention is to reduce the economic losses and health risks caused by mould formation and other microbial surface growth on food materials and articles and feeds.

10 Claims, No Drawings

METHOD FOR PREVENTING MICROBIAL SURFACE DETERIORATION OF FOODS AND FEEDS

This application is a continuation-in-part of our co-pending application, Ser. No. 315,186, filed Dec. 14, 1972, now abandoned.

BACKGROUND OF THE INVENTION

Deterioration due to mould attack occurs extensively particularly in so-called half-dry food articles and feeds such as bread, cheeses, smoked fish, dry sausages, air dried fruits, and air dried fish, especially when they are stored in packaged condition. Industrial food processing plants incur, through mould attack, losses which are difficult to assess, both in the form of returned, deteriorated products and of imparied sales owing to the products' inferior keeping quality. The consumers, too, are caused direct losses by such deterioration, but in addition they also run health risks because of the toxins formed by moulds, which may already be produced before the growth of mould is visually observable. One such dangerous toxin to which great attention has been paid in recent years is aflatoxin. Heretofore, attempts have been made to prevent mould formation by using packaging materials permeable to moisture, by intensifying the plant hygiene and thus reducing the amount of mould infection, and by using chemical compounds which destroy moulds or inhibit their growth. The use of moisture-permeable packaging materials has remained rather restricted, because it is desired to prevent excessive drying of the foods during storage. Intensifying the plant hygiene has successfully lowered the frequency of mould formation to a significant degree. However, it is impossible in practice to solve the problem completely by this approach, because, for instance, even by filtering the intake air and by ultraviolet treatment it has not been possible to reduce to a sufficiently low level the mould infection by which bread is contaminated while cooling. With the present modes of application, chemical preservatives cannot be added at high enough concentrations to ensure adequate inhibition of mould formation.

Factors limiting the concentrations are: the flavour of the preserving agents, their inhibitory effect on fermentation (e.g. on addition to yeast dough), the physiologically harmful effects of high concentrations, and also legal restrictions.

Besides mould formation, a considerable part of other deterioration of foods and feeds is a result of growth and metabolism of aerobic microorganisms, which are deposited on the surface of food or feed through post-processing contaminations such as from air, from the hands of an operator, from equipment and utensils etc. Typical examples are the formation of slime on the surface of slaughtered animal carcasses cold storage, or the growth of bacterial colonies on sliced sausage. In these cases, too, the limitations of the heretofore available methods are in principle the same as mentioned above in regard to the prevention of mould formation.

Since the post-processing microbial contamination in most cases remains on the surface of the food or feed, and the moulds and other aerobic microorganisms, because of their oxygen requirements, generally can multiply only on the superficial layers of the food or feed, the measures aimed at the fighting of moulds and other aerobic microorganisms may usually be concentrated merely on the superficial layer, and the desired preventive effect can thereby be achieved. The procedures applied heretofore for the purpose of applying chemical or equivalent preventives of microorganisms into the superficial layer of the food have been: to dip the food into a solution of chemical preservative, to spray such a solution onto the surface of the food, and to impregnate the packaging material with a chemical preservative. When the first-mentioned method is used, the surface of the food is wetted by water or another solvent, and this is undesirable in many instances. Wetting of the surface is also incurred when the solution is sprayed. Furthermore, the sprayed fluid droplets proceed along straight paths, and therefore all points of the surface are not treated with certainty even though spraying be performed from more than one direction. This is particularly true as regards the depressions and pores in the surface. When the chemical preservative is applied by mediation of the packaging material, those instances are rare in which a good enough contact is obtained between the packaging material and the food to ensure that the concentration of the preserving agent will be high enough at all points of the surface.

Attempts to apply aerosols for surface disinfection in general have so far been unsuccessful. This holds true also for smoking procedures. The preserving agents of wood smoke consist mainly of phenolic compounds and formaldehyde. The concentrations of these compounds on the surface of foods at the end of the smoking process remain usually so small that their inhibiting effect on the microbial growth is only partial. In addition, the concentrations in the smoke of individual chemical compounds effective against microorganisms are not constant, and the smoking processes are not controlled with a view to these effects but rather to the main objectives of the smoking, i.e. the flavour of smoke and the drying of foods. As a result, smoked foods are susceptible to mould formation and to the growth of certain bacteria and yeasts tolerant to low water activites, unless the surface is kept sufficiently dry. In fact, certain types of smoked sausages are ripened with the aid of moulds originating either from natural contamination or added as pure cultures. Likewise, toxin-producing staphylococci are able to multiply on the surface of smoked fish, and this food item is known to cause frequently staphylococcal food poisonings.

The application of aerosols using prior art methods in the treatment of growing vegetables or fruits or other living tissues leads in several cases to thoroughly wetted surfaces, before the treatment is completed. In other cases, where the surface is not totally covered by the substance sprayed, the substance effective against microorganisms can during the subsequent growing period either diffuse or is actively transported by the living tissue also to the uncovered parts of the surface. Such treatments are not usually possible for most other foods or feeds.

SUMMARY OF THE INVENTION

According to the present invention, the preservative is applied to the surface of the food material or article or feed or mould-susceptible substance in the form of liquid or solid aerosol particles of controlled particle size. Preservative is understood to mean substances, previously known in themselves, which destroy microorganisms or inhibit their growth, or preservative substances allowed for use in foodstuffs, When the particle size is small enough, the particles have a Brownian motion in various directions and therefore a probability exists that particles impinge on those parts of the surface of the food or feed which would not be affected by a straight spray. In particular, penetration of the preserving agent into the depressions and pores of the surface is achieved by this novel process. Thus, those portions of the surface are treated, where airborne microorganisms may settle, where a higher relative humidity always prevails than in the outer parts of the surface, and where thus a high probability exists for germination and/or growth of microorganisms.

Using a sufficiently small particle size, one achieves, in addition to good stability of the particles and to the above-mentioned good penetration of depressions and pores, also the possibility of applying the preserving agent to the surface without using any great amount of solvent and therefore only minimal wetting of the surface is incurred. At the same time a high local concentration is obtained at those points which have to be protected and, thereby, the necessary prerequisities for efficient action of the preserving agent are fulfilled. Even so, the total amount of preservative used compared with that of foodstuff treated can be made small enough to avoid the harmful effects of preservatives mentioned above. The low preservative consumption also serves to increase the economy of the treatment, and it enables also expensive preservatives to be used which would not be economically feasible with conventional methods of application. The food materials or articles or feeds to be protected may be solid or semi-solid and consist of heat-processed, other than canned, products such as cooked, braised or baked products, or of an animal or vegetable product virtually sterile beneath the surface, such as meat, poultry, fish, egg or fruit, either fresh, smoked or partially dried, or of a fermented product susceptible to surface deterioration, such as cheese or fermented sausage, or mixtures thereof. The orders of fungi the growth of which is controlled according to this invention, are Eurotiales, Moniliales and Mucorales, and the preservative substances to be used are monocarboxylic acids containing 1-3 C-atoms, sorbic acid, benzoic and hydroxybenzoic and vanillic acid, sodium, potassium, calcium and magnesium salts, esters and anhydrides of the said acids, sodium and potassium phenolates of the hydroxybenzoic acid esters, esters of isothiocyanic acid, diphenyl, sodium o-phenyl phenolate, fungicidic and fungistatic extracts of spices and herbs, pimaricin and antibiotic substances produced by the genera Brevibacterium and Bacillus. This invention also encompasses killing or controlling the growth of bacteria of the families Pseudomonadaceae or Spirillaceae or of the order Eubacteriales, the chemical preservative being chosen from the following: carbonic or hydroxy-carboxylic acids containing 1-3 C-atoms, mono or dihydroxy alcohols containing 2-3 C-atoms, benzoic and hydroxybenzoic acids, esters and anhydrides of the said acids, sodium, potassium, calcium and magnesium salts of the said acids, sodium and potassium phenolates of the hydroxybenzoic acid esters, formaldehyde, hexamethylene tetramine, hydrogen peroxide, chlortetracycline, oxytetracycline, chloramphenicol, bacteriostatic and bactericidic extracts of spices and herbs and antibiotic substances produced by the genera Brevibacterium and Bacillus.

The method can also be applied by using as the aerosol instead of the effective preserving agent an anhydride or some other precursor of the preservative substance, the precursor being transformed upon contact with the food or equivalent into the effective preservative.

For the purpose of forming the aerosol, methods previously known can be used. In choosing the method and apparatus, such conditions should be sought in which a substantial fraction, preferably more than 50 percent, of the number of the particles or droplets with good stability in the aerosol have a diameter less than 5 $\mu$, preferably between 0.2 and 2 $\mu$.

DESCRIPTION OF THE PREFERRED EMBODIMENTS

The treatment of a food material, article or feed according to the present invention is accomplished by placing the food or equivalent for a period of sufficient length, in contact with an aerosol containing the preserving agent or agents, for instance by passing it through a chamber containing such fog, or by conducting such fog into the package. However, the time of stay in the chamber should be long enough to achieve a probability that the droplets penetrate into the depressions and pores of the surface. The requisite time depends, among other things, on the preservative substance used, its content in the carrier medium, the particle size distribution of the aerosol, the particle density, turbulence in the chamber, the geometrical shape of the surface, its aerosol particle attracting or repelling properties, the composition and physical characteristics of the material to be treated, and on the storage time and storage conditions.

The adherence of the preservative particles to the surface of the object under treatment and their expedient distribution thereon may be promoted by undertaking the treament in a partial or total vacuum or by utilizing an electrostatic charge. The use of vacuum can be applied e.g. in a case when the object is porous, in which case the aerosol is deposited advantageously on the surface of the product as the aerosol is blown into the evacuated space containing the product. The pressure in the evacuated space in which the aerosol is applied can be from the lowest practically attainable pressure, that is about 0 kg/cm$^2$, up to about 1 kg/cm$^2$, preferably from about 0.1 to 0.9 kg/cm$^2$. An example of the use of electrostatic charge is described in Example 7. The utilization of an electrostatic charge is advantageous because the electrostatically charged particles or droplets in the aerosol are attracted preferentially to the moist points of the product which are the locations most susceptible to deterioration.

The preservative appropriate in each case can be chosen, considering e.g. the food material, article or feed to be treated and the resistances of the microorganisms which have to be controlled. Advantage may also be taken of the disinfecting or synergistic effect of solvents such as ethanol and propylene glycol permitted as food additives or vegetable extracts known to have microbicidal or microbe-inhibiting effects. It is thus possible also to control the disturbances caused by resistant strains, by using two or more preservative substances in alternation.

The effect of a preservative may further be increased by using for the formation of the aerosol and/or by introducing into the package carbon dioxide, nitrogen or other gas or mixture of gases suppressing the growth of aerobic microorganisms. The aerosol may also be formulated to contain, besides the preservatives against microorganisms, antioxidants such a butylated hydroxyanisole or gallates, and/or compounds forming a water-insoluble film for preventing losses of moisture, such as acetylated monoglycerides or polyvinyl acetate.

In the following examples 1 to 3, the mould contamination consisted of the natural contamination present in the bakeries in which the tests were carried out. The strains isolated belonged to the genera Penicillium, Aspergillus, Cladoporium, Mucor, and Thamnidium. This does not exclude the application of the preservatives, known from the literature, and of the method described, to moulds, yeasts and bacteria of other genera, species and strains.

Ex. 1. A bakery product with about 20% moisture content, containing 0.075% sorbic acid, was treated, subsequent to baking and cooling, for 5 min. in a chamber into which air containing propionic acid fog was conducted. The amount of propionic acid in the air was 30 mg per litre; of the droplets more than 90% had a diameter less than 1 $\mu$. The propionic acid uptake of the surface of the product averaged 0.054% of the weight of the product. In the flavour of the samples no difference could be noted, compared to untreated samples, by an assessment board consisting of 11 persons. Subsequent to treatment, the products were enclosed in polyethylene bags and stored at 28° C. Products of the same kind were also packaged similarly, but without any preceding propionic acid fog treament, and they were stored under identical conditions. The untreated products all grew mouldy within ten days, whereas the treated ones all remained mould-free throughout the observation period of 35 days.

Ex. 2. A bakery product with about 17% moisture content was packed in a polyethylene bag. Subsequently, into this bag a fog containing the methyl ester of parahydroxybenzoic acid, ethanol and propylene gylcol was blown during a period of 15 seconds. Of the droplets more than 50% had a diameter of 0.2–5 $\mu$. The samples, as well as untreated controls, were stored at 26–29° C for 68 days. During this time, 70% of the untreated controls grew mouldy, but only 30% of the treated samples.

Ex. 3. Bakery products similar to those of Example 1 were treated in a chamber containing an aerosol formed by spraying a 15% w/w aqueous solution of potassium sorbate. Of the particles more than 90% had a diameter less than 1 $\mu$. The time of treatment was varied form 2.5 to 7.5 mintues. After the treatment, the products as well as untreated control samples were packed in polyethylene bags, and stored at 28° C. The untreated control samples grew mouldy within 8 to 9 days, whereas the aerosol treated products remained mould-free from 13 to more than 37 days. A spraying of the potassium sorbate solution in an equivalent amount but using a droplet size of more than 10 $\mu$ did not significantly improve the mould-free shelf life.

Ex. 4. Oven-baked cereal based dishes were infected after baking and cooling with spores of Penicillium sp., and treated in a chamber containing an aerosol of propionic acid during 5 minutes. Of the droplets more than 50% had a diameter of 0.2–5 $\mu$. Control samples received the same infection but no aerosol treatment. The samples were packed in polyethylene bags and stored at 30° C. The control samples grew mouldy within 3 days, whereas the aerosol treated samples remained mould-free during 9 days.

Ex. 5. Semi-soft cheese was cut into rectangular pieces of about 300 grams in weight, infected with spores of Penicillium sp., and treated during 5 minutes in a chamber containing an aerosol of propionic acid. Of the droplets more than 90% had a diameter less than 1 $\mu$. Control samples received the same infection but no aerosol treatment. The cheeses were packed in nylon bags and stored at 10° C. All control samples grew mouldy within 6 days. The first visible mould appeared in treated samples after 13 days of storage, and 80% of the infected aerosol treated samples remained mould-free for 14 days or more.

Ex. 6. Small-sized white breads according to Example 1 were placed in a chamber, and the chamber was evacuated to a pressure of 0.1 kg/cm$^2$. Subsequently, the vacuum was released with the aerosol of propionic acid according to Example 1. When the air of the aerosol moved into the pores of the bread, the main part of the droplets of propionic acid in it were retained on the surface of the bread. The concentration of propionic acid in the surface samples after this treatment was 0.14%; that in the samples from the inner parts of the bread was below the analytical detection limit. The keeping quality of the product corresponded to that in Example 1.

Ex. 7. White breads were sprayed with an electrostatic aerosol gun using a direct current voltage of 30 kilovolts. The aerosol consisted of a mixture of propionic acid and propylene gylcol. Of the droplets more than 50% had a diameter of 0.2–5 $\mu$. The breads were hanging on grounded metal hooks or lying on a grounded metal wire net. The spraying distance was 0.5 to 1.0 metre, the time of spraying 2 to 3 seconds. After the treatment the surface of the bread was sprayed with an indicator colour solution, in some of the samples the content of propionic acid in the crust was analyzed chemically. The colour reaction and the chemical analysis showed that the aerosol precipitated preferentially on the more moist areas such as sides and splits, of the bread surface. The keeping quality corresponded to that in Example 1.

Ex. 8. Shanks of cows were cut from the carcasses after slaughtering and treated in a chamber containing an aerosol of the following mixture: 65 parts of an acetylated monoglyceride preparation made from partially hydrogenated vegetable oil, 25 parts of hydrogenated coconut oil, 5 parts of methyl hydroxy benzoate, and 5 parts of butyl hydroxy benzoate. The acetylated monoglyceride and hydrogenated vegetable oil were used to act as a moisture barrier as well as being a solvent for the other components. In the acetylated monoglyceride preparation, The following antioxidants and synergists were added: butylated hydroxyanisole, propyl gallate, citric acid, glycine, and phosphoric acid. More than 50 percent of the droplets of the aerosol were smaller than 5 $\mu$. The duration of the aerosol treatment was 20 minutes, during which a film of a thickness of 0.5 to 1 $\mu$ was formed on the surface of the meats. The content of antimicrobial preservative in this film was calculated to amount to 3 ppm from the total weight of the meat. Subsequently, the meats were stored at +4° C and about 90 percent relative humidity, except during the 4th day from the treatment, when the temperature varied between +10° and +20° C. The control samples without the aerosol treatmment stored under identical conditions reached a surface contamination level of 10$^7$ microbial counts per square centimeter within 7 days, whereas the same contamination level was reached by the aerosol treated meats on the 11th day of storage. The treatment thus prolonged the shelf life of these samples by 50 percent.

Ex. 9. Wheat buns were treated with propionic acid anhydride by a process similar to that of Example 1. Results were equivalent to those in Example 1.

We claim:

1. In a method for preventing microbial surface deterioration of food and feeds by applying to the surface an antimicrobial preservative substance the improvement comprising applying said preservative substance in the form of an aerosol in which a substantial fraction of the particles in the aerosol have a diameter less than 5 microns.

2. The improvement according to claim 1 wherein more than 50% of the particles in the aerosol have a diameter less than 5 microns.

3. The improvement according to claim 1 wherein a substantial fraction of the particles in the aerosol have a diameter between 0.2 and 2 microns.

4. The improvement according to claim 1 wherein said preservative substance is applied at a pressure of about 0 to about 1 kg/cm$^2$.

5. The improvement according to claim 4 wherein said preservative substance is applied at a pressure of about 0.1 to about 0.9 kg/cm$^2$.

6. The improvement according to claim 1 wherein said aerosol particles are attracted to said surface by an electrostatic charge.

7. The improvement according to claim 1 wherein an antioxidant is applied together with said preservative substance.

8. The improvement according to claim 1 wherein a moisture barrier is applied together with said preservative substance.

9. The improvement according to claim 1 wherein said preservative substance is applied by placing said mould susceptible material in a package and conducting said aerosol into said package.

10. In a method for preventing microbial surface deterioration of fresh, smoked, dried, baked, cooked, braised or fermented food material or articles or feeds selected from the group consisting of bakery products, cereal based dishes, meat, poultry, fish, egg, cheese, and fruit, or mixtures thereof, caused by fungi of the orders Eurotiales, Moniliales and Mucorales or bacterial of families Pseudomonadaceae or Spirillaceae or of the order Eubacteriales, by applying one or more preservative substances selected from the group consisting of (a) anti-fungal preservative substances selected from the group consisting of monocarboxylic acids containing 1–3 C-atoms, dihydroxy alcohols containing 2–3 C-atoms, sorbic acid, benzoic and hydroxybenzoic and vanillic acid, sodium, potassium, calcium and magnesium salts, esters and anhydrides of the said acids, sodium and potassium phenolates of the hydroxybenzoic acid esters, esters of isothiocyanic acid, diphenyl, sodium o-phenyl phenolate, fungicidic and fungistatic extracts of spices and herbs, pimaricin and antibiotic substances produced by the genera Brevibacterium and Bacillus to control the growth of the named fungi, (b) anti-bacterial preservative substances selected from the group consisting of carboxylic and hydroxy carboxylic acids containing 1–3 C-atoms, mono or dihydroxy alcohols containing 2–3 C-atoms, benzoic and hydroxybenzoic acids, esters and anhydrides of the said acids, sodium, potassium, calcium and magnesium salts of the said acids, sodium and potassium phenolates of the hydroxybenzoic acid esters, formaldehyde, hexamethylene tetramine, hydrogen peroxide, chlortetracycline, oxytetracycline, chloramphenicol, bacteriostatic and bactericidic extracts of spices and herbs, and antibiotic substances produced by the genera Brevibacterium and Bacillus, and (c) anhydrides and precursors of said preservative substances, the improvement comprising applying the preservative in the form of an aerosol in which a substantial fraction of the particles or droplets in the aerosol have a diameter less than 5 microns.

* * * * *